United States Patent Office 2,802,505
Patented Aug. 13, 1957

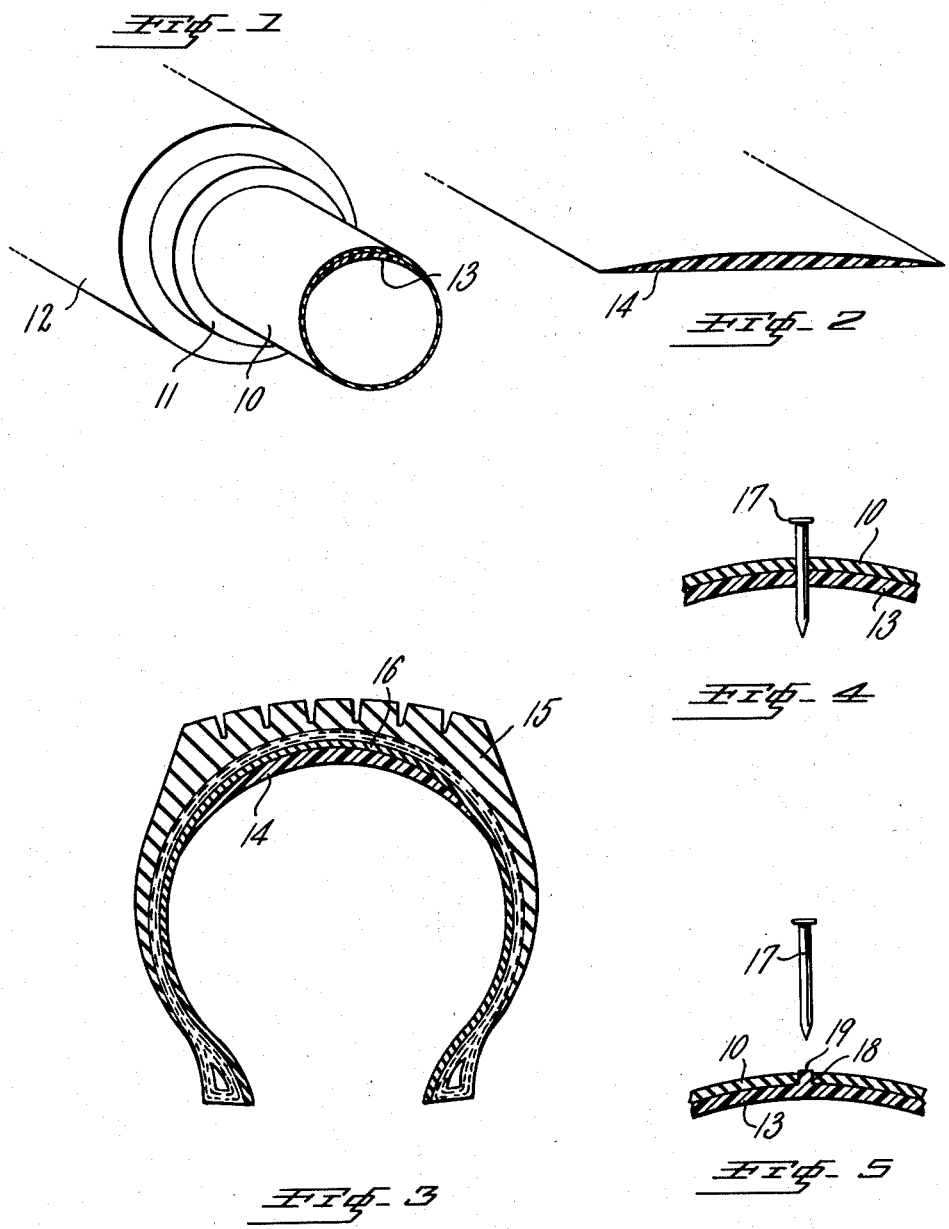

2,802,505

PUNCTURE-SEALING PNEUMATIC ARTICLE

Lester C. Peterson and Harvey J. Batts, Indianapolis, Ind., assignors to United States Rubber Company, New York, N. Y., a corporation of New Jersey Application May 19, 1954, Serial No. 430,834

5 Claims. (Cl. 152—347)

This invention relates to a puncture-sealing pneumatic article, and more particularly it relates to a pneumatic tire or inner tube containing at least in its crown area a layer of puncture-sealing material.

One object of the invention is to provide a puncture-sealing layer for a pneumatic tire or inner tube which will retain a precise desired balance of plastic and elastic properties throughout a prolonged period of use.

Another object of the invention is to provide a pneumatic tire or tube with a layer of puncture-sealant that is essentially immune to a hardening effect due to diffusion of curative materials from adjacent sulfur-vulcanized portions of the tire or tube.

Still another object is the provision of a puncture-sealing material which is so formulated as to be capable of acquiring an exact but limited degree of cure in the course of the conventional vulcanizing cycle to which pneumatic tires or inner tubes are ordinarily subjected.

Additional objects of the invention include the provision of a sealant material that can be easily and conveniently formulated from readily available and economical materials, and that performs efficiently in the final tire assembly.

Additional objects and advantages of the invention will be made manifest in the following detailed description, which is intended to be read with reference to the accompanying drawing, wherein:

Fig. 1 is a largely diagrammatic perspective view of one method of forming an inner tube of the invention by an extrusion operation;

Fig. 2 is a fragmentary perspective view of a shaped portion of sealant material of the invention for use in preparing an inner tube by another method, or for use in preparing a pneumatic tire;

Fig. 3 is a transverse sectional view of a pneumatic tire embodying the invention; and, Figs. 4 and 5 are fragmentary transverse sectional views on an enlarged scale of an inner tube of the invention, illustrating its behavior upon being punctured.

The invention is based on the principle of compounding an essentially permanently plastic material with a lesser amount of a different material that is adapted to be vulcanized to a typical rubbery, elastic state. Such vulcanized, elastic material serves to impart to the otherwise permanently plastic material a certain degree of immobility and elasticity, whereby the plastic material is at once restrained in its proper operative location, and also is rendered just sufficiently elastic to perform the desired puncture-sealing function. In particular, the vulcanizing agent for the portion of the mixture to be converted into a rubbery, elastic state is so selected that it does not cause the permanently plastic portion of the mixture to become hardened or vulcanized. The composition is further characterized by the inclusion of an agent that prevents any migratory curatives contained in the adjacent vulcanized rubber portions of the inner tube or tire from exerting a hardening or vulcanizing action on the plastic ingredient of the mixture.

A particularly advantageous sealant composition embodying the foregoing principles is based upon a major portion, preferably from 80 parts to 97.5 parts, of raw Butyl rubber as the permanently plastic portion of the mixture, and correspondingly from 20 parts to 2.5 parts of the polychloroprene or neoprene type of synthetic rubber as the constituent which is vulcanized to an elastic state for the purpose of imparting immobility and the combination of properties necessary for sealing action. The mixture further includes a vulcanizing agent for the neoprene constituent. Although certain commercially available grades of neoprene rubber apparently already contain some ingredient that promotes cure of the neoprene, we typically additionally employ an added known vulcanizing agent for the neoprene such as a metallic oxide (e. g., zinc oxide or magnesium oxide). More preferably, we employ as the vulcanizing agent for the neoprene an acidic halide, especially a chloride, of a metal, especially a heavy metal such as iron or tin. In all cases, the vulcanizing or curing aid for the neoprene is one which is specific to neoprene, that is, it is not a vulcanizing agent for the Butyl rubber. We have found that the acidic metal halides are admirably suited for this purpose because their vulcanizing action is not only specific to neoprene, but they actually exert a retarding effect on the sulfur cure of Butyl rubber. The significance of this is that the acidic metal halides will therefore protect the Butyl rubber portion of the sealant, which is desired to maintain in a permanently plastic condition, from the gradual hardening action that would otherwise take place while the sealant is in use, as a consequence of the slow diffusion of residual sulfur curatives from the adjacent vulcanized rubber portions of the tire or tube into the sealant layer. Hence, even if the neoprene rubber already contains a substance capable of curing it, we prefer to include additionally at least a small amount of an acidic metal halide as a retarder for vulcanization of the Butyl, or we add some other known retarder, which is usually a material of acidic reaction or nature.

The curing agent for the neoprene is employed in amounts that are conventional, typically within the range of from about ¼ part to 5 parts, based on 100 parts of the combined neoprene and Butyl rubber. The neoprene thus compounded is capable of attaining a substantially fully cured condition in the course of the heating cycle to which an inner tube or a pneumatic tire is subject in ordinary factory practice, and in this condition, the neoprene, when used in the specified amounts, provides a basis for the attainment of the desired balance of plastic and elastic properties in the final mixture. Certain of the metal halides that are known to exert a curing action on neoprene are disclosed in U. S. Patent 2,397,399 of Baird et al., and although those patentees prefer to use the metal halide curing agent in combination with an organic nitrogenous base, we do not ordinarily find it necessary to use such nitrogenous base in our formulation, but we can use the metal halide itself.

The Butyl rubber employed as the essentially permanently plastic ingredient in the composition of the invention is of course a known type of synthetic rubber made by low temperature copolymerization of an isoolefin with a minor proportion of a multi-olefinic unsaturate having from 4 to 14 carbon atoms per molecule. The isoolefins employed generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. The Butyl rubber contains only relatively small amounts of copolymerized diene, typically from about 0.5 to 5%, and seldom more than 10%, on the total weight of the elastomer.

Referring to the drawing, there is illustrated in Fig. 1 a principal step in one method of preparing an inner tube embodying the invention. This method, as well as apparatus particularly well adapted for practicing such method, is disclosed and claimed in copending application Serial No. 363,874 of Mulbarger and Harris, filed June 24, 1953, now Patent No. 2,736,921. In accordance with such method an inner tube 10 is formed by extruding from a compound die 11 of an extruder 12 a conventional vulcanizable rubber inner tube stock, which is ordinarily a Butyl rubber stock compounded for sulfur vulcanization and including the usual organic accelerators. Simultaneously with the extrusion of the inner tube stock there is extruded an integral layer 13 of the plastic sealant material of the invention in a raw state, such layer being so disposed as to cover at least the crown area of the interior surface of the inner tube. The extruded assembly is thereafter cut into appropriate lengths and butt-spliced to form an annulus, and subsequently the assembly is disposed in the usual inner tube mold for vulcanization in the shape of an inner tube, all in accordance with conventional practice.

In place of forming the layer of plastic sealant integrally with the inner tube by a dual tubing operation, the plastic sealant may instead be formed into the shape of a strip 14, as shown in Fig. 2, by any conventional means such as extrusion or calendering, and such strip of plastic sealant may be employed to construct a laminated inner tube by any suitable conventional method, or by the particular method disclosed in application Serial No. 402,405 of Neill and Reed, filed January 4, 1954, now Patent No. 2,739,639. Also, the strip 14 may be employed to construct a puncture-sealing pneumatic tire, of the kind illustrated in Fig. 3. In Fig. 3, the layer of plastic sealant 14 is shown applied to the interior crown surface of a pneumatic tire 15 of the so-called tubeless type, such tire including on its interior band ply surface an additional layer 16 of air-retaining lining material, in accordance with conventional practice.

The manner in which the plastic sealant material of the invention, after being subjected to vulcanizing conditions, performs the sealant function is illustrated in Figs. 4 and 5, wherein it is shown how a nail 17 or similar puncturing object, after passing through the rubber wall 10 and plastic sealant layer 13 of the inner tube, and being withdrawn therefrom leaves a hole 18 in the wall of the inner tube, which is filled up and sealed by a knob or plug 19 of the sealant material, which tends to be pulled out through the hole 18 as the puncturing nail 17 is withdrawn. It will be evident that this sealing action is dependent upon the provision and maintenance of a particular condition of elasticity and plasticity, as provided for in the present invention, and it will also be evident that it is essential for the sealant to remain in place in its proper operating position, in spite of the centrifugal and other forces that ordinarily tend to displace the plastic material.

The following example will illustrate the practice of the invention in more detail. In the example, all parts are expressed by weight.

Example

| | |
|---|---|
| GR-I15 | 90.00 |
| Neoprene W | 10.00 |
| Carbon black (fast extruding furnace) | 40.00 |
| Stearic acid | 1.00 |
| Piccolyte S-115 resin | 25.00 |
| $FeCl_3.6H_2O$ | 1.00 |

The above ingredients were mixed on conventional rubber mixing equipment. The GR-I15 was a commercial grade of Butyl rubber, while the Neoprene W was a commercially available grade of polychloroprene synthetic rubber. The carbon black was included in the mixture as a filler for the purpose of permitting smooth and satisfactory compounding and processing, by suppressing the nerve of the composition to a substantial extent. When suitably loaded with an appropriate filler, the mixture provides the desired balance of elastic and plastic properties, and fillers that may be used for this purpose may be any relatively inert, solid, finely powdered material, such as carbon black, clay, mica, calcium carbonate, precipitated hydrated silica, precipitated hydrated calcium silicate, zinc oxide, diatomaceous earth, wood flour or similar fillers known in the rubber compounding art. Usually a total of 20 to 150 parts, and preferably from about 30 to 50 parts, by weight of such filler material is employed to 100 parts of the mixture of neoprene and Butyl rubber. Carbon black is a preferred filler. The Piccolyte resin is a commercially available plasticizer believed to be a polyterpene resin. Such a softener or plasticizer is preferably included in the mixture, and it should be of the kind that the skilled rubber compounder refers to as non-migratory, that is, in the final assembly, the plasticizer should have a preference for remaining within the sealant layer with which it is compounded, rather than volatilize or diffuse into the material of the adjacent parts of the inner tube or tire. In this way, the properties of the sealant will be substantially maintained over a prolonged period of service life. The plasticizer is preferably of a somewhat sticky nature, to increase the tack of the material. Mineral oils, rosin oil, or other known plasticizers may be used. Preferred softeners are liquid tacky resinous materials of high molecular weight, such as polybutene, or synthetic resins such as the paracoumarone-indene type. Such materials are well known to the skilled rubber compounder. When sufficient plasticizer is used to impart workability to the stock and to leave it in a softened condition, the mixture will be best suited to perform the sealant function. Usually from about 8 to 50 parts, and preferably from about 20 to 30 parts, of softener is sufficient for this purpose.

Samples of the above mixture were cured by heating in molds at 320° F. for varying periods of time, after which the plasticity of the material was measured by the method described in application Serial No. 290,344 of Linhorst, filed May 27, 1952, now Patent No. 2,702,287, with the following results:

| Time of cure: | Linhorst plasticity |
|---|---|
| 0 | 0.015 |
| 5' | 0.036 |
| 8' | 0.050 |
| 30' | 0.053 |

The Linhorst plasticity values are expressed in inches, and are obtained on a 0.075 gauge sample molded for three minutes at 212° F. The plasticity is a 12 minute reading obtained with an eight pound weight at 212° F. in the Linhorst plastometer apparatus. In general, it may be stated that final compounds in which the Linhorst plasticity is within the range of from 0.015 and 0.04 represent satisfactory sealants.

Inner tubes were prepared in accordance with the foregoing procedure, and road tested extensively under actual operating conditions. The inner tubes were found to seal punctures effectively, and it was observed that even after 200 miles of operation on the test car, the plastic sealant was still in place, that is, no plastic flow of the sealant had occurred. The remarkableness of this result, in comparison to the usual sealant materials, will be appreciated when it is considered that it has heretofore been the practice to enclose the sealant material in various kinds of barriers or net work restraining means, in order to prevent the sealant material from undergoing plastic flow. The undesirability of using such mechanical barriers will be apparent, both from the standpoint of complicating the building operation and reducing the effectiveness of the sealant layer, as well as from the standpoint of making the assembly thicker and heavier than would otherwise be desirable, with consequent increased heat build-up. In the present instance, the neoprene constituent gives structure to the whole, thereby providing resistance to plastic flow. The metallic halide cures the neoprene, thus giving the desired structure, and at the same time assures a permanency of the desired properties by rendering the Butyl rubber insensitive to any cure from migrating sulfur type curatives contained in the adjacent vulcanized rubber parts of the tire or tube. Since there is no cure in the Butyl phase of the compound, the basic plastic nature of the material remains unchanged.

As indicated previously, the metal halides, and especially metal chlorides, notably hydrated ferric chloride and hydrated stannous chloride, are unusually suitable curing agents in the present combination because they also act as retarders for the Butyl rubber. It will be understood that the conventional sulfur vulcanized rubber parts of the inner tube or tire contain residual products derived from the sulfur-bearing vulcanizing agents and accelerators originally included in such compounds, and these residual materials ordinarily would tend to migrate over a long period of time out of the vulcanized rubber parts and into the plastic sealant layer where, at the elevated temperatures prevailing in use, they would exert a pronounced hardening on the plastic sealant, and render it worthless for its intended purpose after a time. The present invention affords a remarkably simple and effective means of forestalling this disadvantageous occurrence.

Having thus described our invention, what we claim and desire to protect by Letters Patent is:

1. A puncture-sealing pneumatic article having at least in its crown area a layer of puncture-sealing plastic material comprised of a large amount of a synthetic rubbery copolymer of an isoolefin having from 4 to 7 carbon atoms with from 0.5 to 10% of a diolefin having from 4 to 6 carbon atoms, the said rubbery copolymer being in a permanently plastic, uncured state, and a small amount of polychloroprene rubber, the said polychloroprene rubber being in a cured condition, and the said cured polychloroprene serving to give structure to the said isoolefin-diolefin copolymer rubber and maintain it in place.

2. A puncture-sealing pneumatic article having a layer of sealant plastic in at least its crown area comprised of from 80 to 97.5 parts of a synthetic rubbery copolymer of an isoolefin having from 4 to 7 carbon atoms with from 0.5 to 10% of a diolefin having from 4 to 6 carbon atoms, the said rubbery copolymer being in a permanently plastic, uncured state, and from 20 to 2.5 parts of polychloroprene rubber, the said polychloroprene rubber being cured by a vulcanizing agent therefor which is not a vulcanizing agent for the said isoolefin-diolefin copolymer rubber.

3. A puncture-sealing pneumatic article containing at least in its crown area a layer of plastic sealant material, the said pneumatic article comprising a vulcanized rubber body containing residual sulfur-bearing vulcanizing agent and accelerator which migrate over a long period of time out of such rubber body into the said layer of plastic sealant, the layer of plastic sealant being comprised of from 80 to 97.5 parts of an unvulcanized synthetic rubbery copolymer of an isoolefin having from 4 to 7 carbon atoms with from 0.5 to 10% of a diolefin having from 4 to 6 carbon atoms, and from 20 to 2.5 parts of cured polychloroprene rubber, the said polychloroprene rubber being cured with from 0.25 to 5 parts of an acidic metal halide curing agent, said metal halide curing agent serving as a retarder of sulfur vulcanization of the said unvulcanized isoolefin-diolefin copolymer rubber, whereby the said migrating sulfur-bearing materials are prevented from causing hardening of said unvulcanized rubbery copolymer.

4. A puncture-sealing pneumatic article as in claim 3 in which the said metal halide is tin chloride.

5. A puncture-sealing pneumatic article as in claim 3 in which the said metal halide is iron chloride.

References Cited in the file of this patent
UNITED STATES PATENTS

| | | |
|---|---|---|
| 2,397,399 | Baird et al. | Mar. 26, 1946 |
| 2,438,965 | Dasher | Apr. 6, 1948 |
| 2,519,231 | Crawford et al. | Aug. 15, 1950 |